March 13, 1962     I. B. BICKLER     3,025,516
FREQUENCY CONTROL SYSTEM FOR RADIO IDENTIFICATION APPARATUS
Filed Nov. 3, 1952
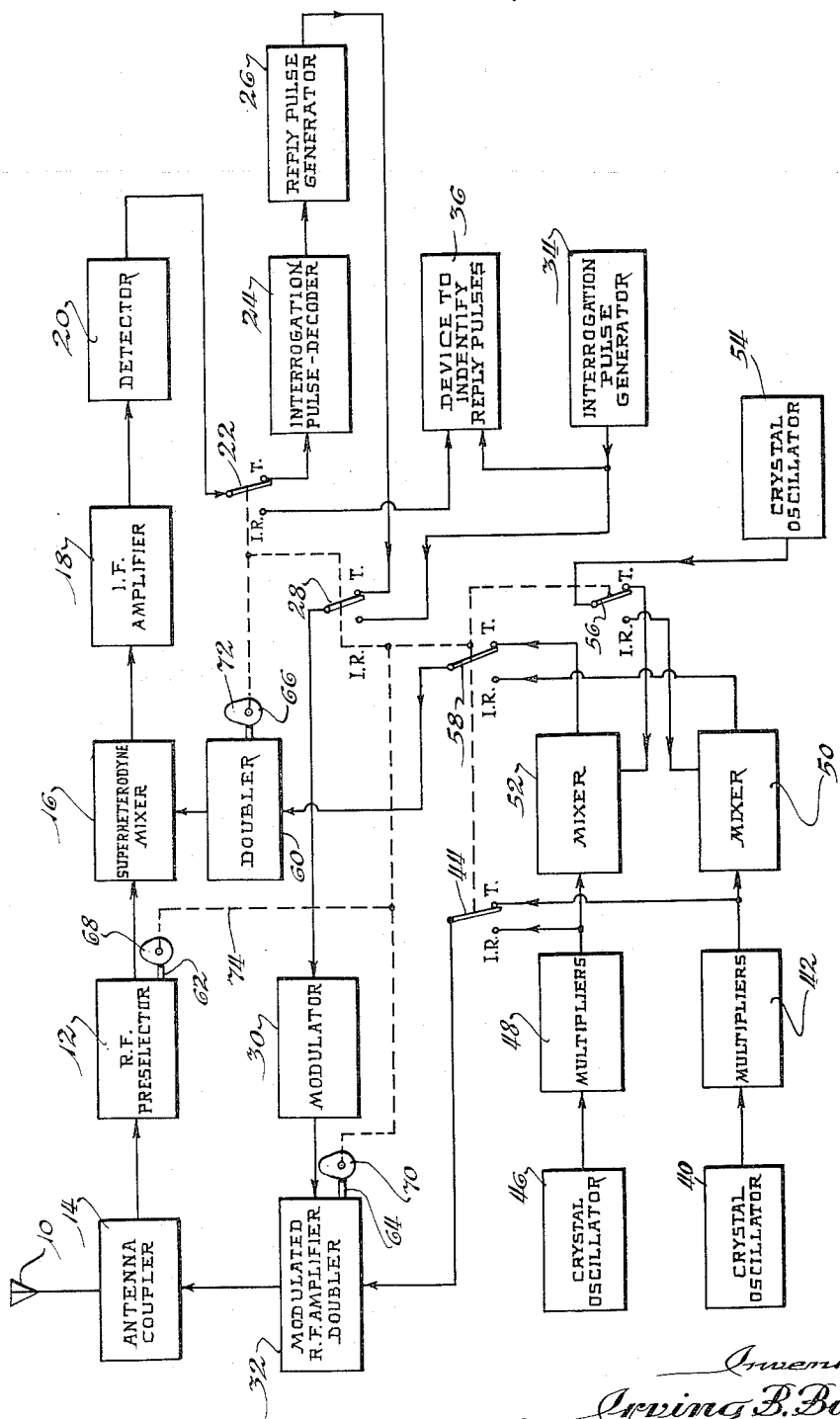
Inventor:
Irving B. Bickler
By Benjamin F. Hupper
Attorney

# United States Patent Office 3,025,516
Patented Mar. 13, 1962

3,025,516
FREQUENCY CONTROL SYSTEM FOR RADIO IDENTIFICATION APPARATUS
Irving B. Bickler, Chicago, Ill., assignor to Stewart-Warner Corporation, Chicago, Ill., a corporation of Virginia
Filed Nov. 3, 1952, Ser. No. 318,355
6 Claims. (Cl. 343—6.5)

This invention relates to improvements in radio systems for identifying friend and foe. Such systems are particularly useful for distinguishing friendly from unfriendly aircraft.

In a system to which this invention relates, coded interrogation pulses are transmitted toward an unidentified aircraft, on an interrogation radio frequency. A friendly craft has an apparatus which receives the interrogation pulses, decodes them, and sends back reply pulses on a different reply frequency. At the interrogating station apparatus is provided to receive and identify the reply pulses.

It will be apparent that every friendly airplane must be equipped with a device to receive the interrogation pulses and send back reply pulses. Such a device is often called a transpondor. It is desirable to equip an airplane with a radio set for determining whether other planes are friendly or unfriendly. Such a set is often called an interrogator-responsor.

An object of this invention is to provide a radio set which serves both as a transpondor and an interrogator-respondor.

A further object is to provide such a combination set in which many of the components are used both for responding and interrogating.

A further object is to provide such a combination set in which the same frequency determining crystals are used for both responding and interrogating.

Further objects, advantages, and features of the invention will appear from the following description of an illustrative combination transpondor and interrogator-responsor, constructed in accordance with the invention. The description should be read with reference to the accompanying drawing, in which the single figure is a block diagram of the embodiment.

The construction and operation of the radio set illustrated in the drawing will first be explained with regard to the transponding mode of operation, in which the set receives interrogation pulses and sends back reply pulses.

The set has an antenna 10 which serves for both receiving and transmitting. Interrogation signals are carried from the antenna to a radio frequency preselector 12 by means of an antenna coupler 14. The radio frequency preselector rejects unwanted signals lying outside a predetermined frequency band which is sufficiently wide to pass the interrogation signals. The interrogation signals may occupy a band in the neighborhood of 1000 megacycles. The preselector may also provide some amplification.

From the preselector the interrogation signals pass to a superheterodyne mixer 16, in which the signals are heterodyned down to an intermediate frequency which may be in the neighborhood of 60 megacycles. The intermediate frequency signals are amplified by an I.F. amplifier 18 and then demodulated by a detector 20. The preselector 12, mixer 16, I.F. amplifier 18, and detector 20, may collectively be regarded as a radio receiver.

At this point, the interrogation signals are in the form of coded pulses. The coded pulses are directed by a changeover switch 22 to an interrogation pulse decoder 24, which determines whether the pulses have come from a friendly station. If they have, a reply pulse generator 26 produces coded reply pulses in response to a stimulus from the decoder 24.

The reply pulses are directed by a changeover switch 28 to a modulator 30, and thence to a modulated radio frequency amplifier 32 which produces a radio frequency output which is modulated in accordance with the reply pulses. The radio frequency output carrier is at the reply frequency, which is somewhat different from the interrogation frequency. The radio frequency output is applied to the antenna 10 by means of the antenna coupler 14.

In the drawing, the changeover switches 22 and 28 are shown in their transponding positions. For interrogating-responsing, the switches are shifted to their opposite positions.

During interrogating-responsing, coded interrogation pulses are originated by an interrogation pulse generator 34. They are directed by the switch 28 to the modulator 30, and thence to the modulated radio frequency amplifier 32, which is now operating on the interrogating frequency. The amplifier 32 produces a radio frequency output which is modulated in accordance with the interrogation pulses. The radio frequency output is applied to the antenna 10 by the antenna coupler 14.

The antenna directs the interrogation signals to another airplane, which sends back properly coded reply pulses if it is friendly. The reply signals pass through the radio frequency preselector 12, which is now tuned to the reply frequency. The frequency of the reply signals is reduced to the intermediate frequency by the mixer 16. The I.F. signals are amplified by the I.F. amplifier 18, and demodulated by the detector 20, to produce coded reply pulses. The coded reply pulses are directed by the switch 22 to a device 36 to identify reply pulses and to indicate whether the unknown plane is friend or foe. The indentification device 36 may also utilize the interrogation pulses from the generator 34.

All of the components indicated by blocks in the drawing are well known to those skilled in the art.

From the foregoing description, it will be clear that the modulated amplifier 32 operates at the reply frequency during transponding, and at the interrogating frequency during interrogating-responsing. Consequently, the mixer 16 must be provided with different local heterodyning frequencies for transponding and interrogating-responsing. In each case the local heterodyning frequency must differ from the received frequency by the amount of the intermediate frequency.

The modulated amplifier 32 also serves as a radio frequency doubler. The radio set includes a crystal oscillator 40 which produces a carrier signal which is multiplied by multipliers 42 to one-half the reply frequency. During transponding, the output of the multipliers 42 is directed to the radio frequency input of the amplifier-doubler 32 by a changeover switch 44.

A crystal oscillator 46 produces a signal which is multiplied in frequency by multipliers 48 to one-half the interrogating frequency. During interrogating-responsing, the output of the multipliers 48 is applied to the amplifier-doubler 32 by the switch 44.

The outputs of the multipliers 42 and 48 are also applied to respective mixers 50 and 52. A crystal oscillator 54, operating at one-half the intermediate frequency, produces an output which is applied to the mixer 52 by a switch 56 during transponding. The mixer 52 heterodynes the output of the multipliers 48 against the output of the oscillator 54 to produce an output at a frequency differing from one-half the interrogating frequency by one-half the intermediate frequency. During transponding the output of the mixer 52 is directed by a switch 58 to a frequency doubler 60. The doubler 60 produces an output which is applied as a local heterodyning signal to the super-heterodyne mixer 16. During transponding the output of the doubler 60 has a frequency which differs from the interrogating frequency by the intermediate frequency.

During the interrogating-responsing (IR) mode of operation, the output of the oscillator 54 is directed to the mixer 50 by the switch 56. The mixer beats the output of the multiplier 42 against the output of the oscillator 54 to produce an output having a frequency differing from one-half the reply frequency by one-half the intermediate frequency. During IR operation, the output of the mixer 50 is applied to the doubler 60 by the switch 58. The doubler 60 applies a local signal to the mixer 16, the signal having a frequency differing from the reply frequency by the intermediate frequency.

The radio frequency preselector 12, the modulated amplifier 32, and the doubler 60, may have respective movable tuning plungers 62, 64, and 66, for shifting the operating frequencies of these components. Means such as respective cams 68, 70, and 72, may be provided to change the operating frequencies of these components when a change is made from transponding to interrogating-responsing, or vice versa. During transponding the radio frequency preselector 12 is tuned to the interrogation frequency; the modulated amplifier 32, to the reply frequency; and the doubler 60, to the local heterodyning signal frequency, which differs from the interrogation frequency by the intermediate frequency. During interrogating-responsing, the radio frequency preselector 12 is tuned to the reply frequency; the modulated amplifier 32, to the interrogation frequency; and the doubler 60, to a local injection frequency differing from the reply frequency by the intermediate frequency.

As indicated in the drawings, the changeover switches 22, 28, 44, 56, and 58, and the cams 68, 70, and 72, may all be operated by a common drive 74.

The modulated amplifier 32 and the modulator 30 may be regarded as a modulated stage of a transmitter. The input to the modulator 30 may be regarded as the modulation input to the modulated stage.

The antenna coupler 14, the oscillators 40 and 46, and the multipliers 42 and 48, serve as both transmitter and receiver components.

It is merely a matter of convenience to provide the doubler 60 and to operate the modulated amplifier 32 as a doubler. The multipliers 42 and 48 might be operated at the reply and interrogation frequencies respectively, particularly if both frequencies were considerably lower than 1000 megacycles. We then could take a tap-off before the final multipliers and feed into mixers 52 and 50 as originally stated.

The construction and operation of the radio set may be summarized by means of a specific example, setting forth in tabular form a possible set of operating frequencies, the frequencies being expressed in megacycles.

|  | Frequency for transponding | Frequency for interrogating-responsing |
| --- | --- | --- |
| Interrogation frequency | 1,020 | 1,020 |
| Reply frequency | 1,100 | 1,100 |
| R.F. preselector frequency | 1,020 | 1,100 |
| Modulated amplifier frequency | 1,100 | 1,020 |
| Intermediate frequency | 60 | 60 |
| Crystal oscillator 54 | 30 | 30 |
| Multipliers 42 | 550 | 550 |
| Multipliers 48 | 510 | 510 |
| Mixer 50 |  | 580 |
| Mixer 52 | 540 |  |
| Doubler 60 | 1,080 | 1,160 |

It should be noted that the output frequencies of the multipliers 42, the multipliers 48, and the oscillator 54, have the same ratio to the reply frequency, the interrogation frequency, and the intermediate frequency, respectively.

The reply and interrogating frequencies may be changed by shifting the frequencies of the oscillators 40 and 46, trimming up the multipliers 42 and 48, and resetting the tuning cams 68, 70, and 72.

By means of this invention, two sets of frequency standards, which may be crystals, determine four sets of frequencies, namely, the interrogating frequency, the reply frequency, the interrogating local oscillator frequency, and the reply local oscillator frequency. A third frequency standard determines the intermediate frequency. The invention provides a great reduction in the number and total weight of the components, together with a reduction in the number of crystals that must be kept in stock to effect frequency changes.

Many of the details of the embodiment described above are merely illustrative and should not be taken as limitative. The invention may be practiced in many equivalent arrangements. The general scope of the invention is indicated by the following claims.

I claim:

1. In a radio identification apparatus including a receiving channel having a superheterodyne mixer, and a transmitting channel having a modulated stage; a first source operating at a first radio frequency to establish an interrogating frequency, a second source operating at a second different radio frequency to establish a reply frequency, a changeover switch to connect either of the sources to the modulated stage, a first mixer receiving the output of the first source, a second mixer receiving the output of the second source, a third source operating at a third frequency to establish a superheterodyne intermediate frequency, means to connect the third source to the first and second mixers, and a second changeover switch to connect either of the mixers to the superheterodyne mixer to provide a local heterodyning signal.

2. In a radio identification apparatus including a receiver having a superheterodyne mixer, and a transmitter having a modulated stage; a first source operating at a first radio frequency to establish an interrogation frequency, a second source operating at a second different radio frequency to establish a reply frequency, a first mixer receiving the output of the first source, a second mixer receiving the output of the second source, a third source operating at a third frequency to establish a superheterodyne intermediate frequency, means to connect the third source to the first and second mixers, and a ganged changeover switch having a first section to connect either of the sources to the modulated stage and a second section to connect the second mixer to the superheterodyne mixer when the first source is connected to the modulated stage, and to connect the first mixer to the superheterodyne mixer when the second source is connected to the modulated stage, to provide a local heterodyning signal.

3. In a radio identification apparatus including a receiver having a superheterodyne mixer, and a transmitter having a modulated stage; an interrogation pulse decoder, a reply pulse generator connected to the output of the decoder, an interrogation pulse generator, an identifying device to identify reply pulses, a first changeover switch to connect the receiver output to the decoder for responding operation and to the identifying device for interrogating operation, a second changeover switch to connect the modulation input of the modulated stage to the output of the reply pulse generator for responding and to the output of the interrogation pulse generator for interrogation, a first source operating at a first radio frequency to establish an interrogating frequency, a second source operating at a second different radio frequency to establish a reply frequency, a third changeover switch to connect the radio frequency input of the modulated stage to the second source for responding and to the first source for interrogation, a first mixer receiving the output of the first source, a second mixer receiving the output of the second source, a third source operating at a third frequency to establish a superheterodyne intermediate frequency, means to connect the third source to the first and second mixers, a fourth changeover switch to connect the superheterodyne mixer to the first mixer for responding and to the second mixer for interrogation, and means to shift all of the switches between their responding and interrogating positions simultaneously.

4. In a combination interrogating and responding radio apparatus having a receiver including a superheterodyne mixer, and a transmitter having a modulated stage; a first source operating at a first radio frequency having a predetermined ratio to an interrogation frequency, a second source operating at a second different radio frequency having the same predetermined ratio to a reply frequency, a first changeover switch to connect the radio frequency input of the modulated stage to the second source for responding and to the first source for interrogation, a first mixer receiving the output of the first source, a second mixer receiving the output of the second source, a third source operating at a third frequency having the same predetermined ratio to a superheterodyne intermediate frequency, means to connect the third source to the first and second mixers to produce local signals for the superheterodyne mixer, and a second changeover switch to connect the superheterodyne mixer to the first mixer for responding and to the second mixer for interrogation.

5. In a combination interrogating and responding radio apparatus having a receiver including a superheterodyne mixer, and a transmitter having a modulated stage; a first source operating at a first radio frequency having a predetermined ratio to an interrogation frequency, a second source operating at a second different radio frequency having the same predetermined ratio to a reply frequency, a first changeover switch to connect the radio frequency input of the modulated stage to the second source for responding and to the first source for interrogation, a first mixer receiving the output of the first source, a second mixer receiving the output of the second source, a third source operating at a third frequency having the same predetermined ratio to a superheterodyne intermediate frequency, means to connect the third source to the first and second mixers to produce local signals for the superheterodyne mixer, a second changeover switch to connect the superheterodyne mixer to the first mixer for responding and to the second mixer for interrogation, and means to shift the first and second switches between their responding and interrogation positions simultaneously.

6. In a combination interrogating and responding radio apparatus including a receiver having a superheterodyne mixer, and a transmitter having a modulated stage, the mixer having a local signal input, and the modulated stage having a modulation input and a radio frequency input; an interrogation pulse decoder, a reply pulse generator connected to the output of the decoder, an interrogation pulse generator, an identifying device to identify reply pulses, a first changeover switch to connect the receiver output to the decoder for responding and to the identifying device for interrogating, a second changeover switch to connect the modulation input of the modulated stage to the output of the reply pulse generator for responding and to the interrogation pulse generator for interrogation, a first source operating at a first radio frequency having a predetermined ratio to an interrogation frequency, a second source operating a second different radio frequency having the same predetermined ratio to a reply frequency, a third changeover switch to connect the radio frequency input of the modulated stage to the second source for responding and to the first source for interrogation, a first mixer receiving the output of the first source, a second mixer receiving the output of the second source, a third source operating at a third frequency having the same predetermined ratio to superheterodyne intermediate frequency, means to connect the third source to the first and second mixers to produce local signals for the superheterodyne mixer, a fourth changeover switch to connect the local signal input of the superheterodyne mixer to the output of the first mixer for responding and to the output of the second mixer for interrogation, and means to shift all of the switches between their responding and interrogation settings simultaneously.

References Cited in the file of this patent

UNITED STATES PATENTS 2,419,593     Robinson _____ Apr. 29, 1947
2,509,963     Collins _____ May 30, 1950

OTHER REFERENCES

Stuart: "Identification, Friend or Foe," Tele-Tech, January 1947, pp. 60–67 inclusive.